(12) United States Patent
Barendregt et al.

(10) Patent No.: US 6,322,438 B1
(45) Date of Patent: Nov. 27, 2001

(54) POULTRY LEG AND THIGH PROCESSOR (75) Inventors: Gerrit Barendregt, Heinenoord; Floris Wols, Rotterdam; Wim Steenbergen, Numansdorp, all of (NL)

(73) Assignee: Systemate Group, B.V., Numansdorp (NL)

( * ) Notice: Subject to any disclaimer, the term of this patent is extended or adjusted under 35 U.S.C. 154(b) by 0 days.

(21) Appl. No.: 09/354,444

(22) Filed: Jul. 15, 1999

(51) Int. Cl.[7] .................................................. A22C 21/00
(52) U.S. Cl. .......................... 452/167; 452/163; 452/170; 452/155
(58) Field of Search .................................... 452/167, 163, 452/166, 169, 170, 149, 150, 152, 160

(56) References Cited

U.S. PATENT DOCUMENTS

| 4,815,168 | 3/1989 | van den Nieuwelaar et al. |
| 4,896,399 | * 1/1990 | Hazenbroek ........................ 452/167 |
| 4,939,813 | * 7/1990 | Hazenbroek ........................ 452/167 |
| 5,015,213 | * 5/1991 | Hazenbroek ........................ 452/167 |
| 5,019,013 | 5/1991 | Hazenbroek ........................ 452/151 |
| 5,035,673 | 7/1991 | Hazenbroek ........................ 452/149 |
| 5,147,240 | 9/1992 | Hazenbroek et al. ............... 452/165 |
| 5,154,665 | 10/1992 | Hazenbroek ........................ 452/155 |
| 5,188,559 | * 2/1993 | Hazenbroek ........................ 452/167 |
| 5,336,127 | 8/1994 | Hazenbroek ........................ 452/160 |
| 6,004,199 | * 12/1999 | Habenicht et al. ................... 452/167 |

* cited by examiner

Primary Examiner—Willis Little
(74) Attorney, Agent, or Firm—Thomas, Kayden, Horstemeyer & Risley (57) ABSTRACT

Previously eviscerated poultry carcasses with legs and backs remaining are suspended from shackles (25) by their legs and moved in sequence along a processing path. The backs are received on a surface conveyor (18) having parallel conveyor flights (36, 37), so that the rounded portions (31) of the surfaces of the backs (30) seek the space between the conveyor flights, thereby tending to center the carcasses moving along the poultry path. The backs are turned from inverted attitudes to upright attitudes while the legs remain inverted, thereby tending to rotate the thighs with respect to the backs, loosening the sockets between the thighs and backs, and the visceral cavities are placed on a rotary disk (28) formed of UHMW and having peripheral teeth with radially extending teeth surfaces which engage the backbone areas of the visceral cavities of the carcasses. The rotary disk is sufficiently wide in order to span the backbone area of the visceral cavity, to urge the carcasses through a downward arc while the legs and thighs are carried horizontally and cut away from the backs of the carcasses.

8 Claims, 8 Drawing Sheets

POULTRY LEG AND THIGH PROCESSOR

TECHNICAL FIELD

This invention relates to automated poultry processing, particularly to an apparatus and method for use along an automated poultry processing line, to separate the thighs of poultry carcasses from the back portions of the carcasses.

BACKGROUND OF THE INVENTION

In recent years, the processing of poultry has been automated so that most of the evisceration and cut-up steps are formed by mechanical devices. This has dramatically increased the speed and efficiency of poultry processing and has thus provided the consuming public with high quality poultry products at more reasonable prices.

Most of the modem poultry processing equipment is designed for use along suspended conveyor systems having a series of equally spaced depending shackles from which poultry carcasses are suspended upside down by their legs and conveyed along a processing path. Various processing machines are disposed along the processing path for operating upon the suspended carcasses progressively as they move along the path, to prepare the poultry for public sale and consumption.

A typical poultry processing line might include, for example, a vent cutter, a bird opener, an eviscerator, a neck breaker, a lung puller, and a crop remover. In addition, such processing lines might include machines for subdividing the poultry carcasses into their various commonly consumed pieces, such as breasts, backs, wings, legs and thighs.

The step of separating the poultry thigh from the back portion of the carcass is difficult to perform uniformly from bird to bird and without damaging the bone of the joint where the thigh is separated from the back portion. The muscles and tendons adjacent the joint are difficult to reach with automated cutting implements and there is a hazard that the cutting implements will chip, crack or splinter the bones as they make the cuts between the bones of the joints, leaving potentially harmful bone chips in the edible product.

As disclosed in U.S. Pat. 5,188,559 issued Feb. 23, 1993, automated machines are available for separating the thighs from the back portions of birds as birds are suspended upside down by their legs and moved in sequence along a processing path. While the machines have been largely successful, there are occasions when the birds are not properly aligned as they pass through the initial cutting blades for initially cutting the tissue that holds the bones of the joints together at the thigh and the back portion of the carcass. The tissue surrounding the bones of the joint of the thigh and back must be progressively cut to open the joint, and once the joint is open, it is desirable to rotate the back portion of the bird with respect to the thighs so as to twist the socket of the back portion away from the thigh bones, while cutting the tissue that connects the thighs to the back portion. It is highly desirable that more of the meat be left on the thighs than on the back portion, since the thighs are much more valuable than the back portions. Also, it is desirable to make a perfect cut about the thigh bones after the back portions have been rotated to pull the thighs from their sockets so that the appearance of the meat clinging to the thighs is not degraded during the cutting and removing procedures.

An important aspect of achieving the perfect cut between the thigh and the back portion is control of the position of the bird as the bird progresses through the cutting and removal procedures.

Accordingly, it would be desirable to provide an improved method and apparatus for more accurately guiding the poultry carcass to the cutters which cut through the tissue extending between the thighs and the back portions of the carcasses, and then to firmly grasp and pull the back portion of the carcass away from the thighs with a tumbling movement of the back portion so as to rotate the back portion with respect to the proximal end of the thigh bone, causing the back portion to progressively separate from the thighs and allowing the meat which can be pulled by the thighs from the back portion to remain with the thighs, thereby enhancing the weight and value of the thighs. It is to the provision of such a method and apparatus that the present invention is primarily directed.

SUMMARY OF THE INVENTION

The present invention involves an automated apparatus for separating the legs, including the thighs, from the backs of poultry carcasses as the carcasses are progressively conveyed in sequence suspended upside down by their legs on shackles along a suspended processing path. The carcasses will have been previously processed in prior stations along the processing path for the removal of the entrails and the breasts of the carcasses, so that the carcasses are received in a "saddle" configuration with their back portions, thighs and legs still attached to each other, with the carcasses being suspended by their legs, with their tails trailing behind the rest of their backs.

The apparatus includes a frame adapted to be positioned beneath the suspended conveyor system and generally along the path of movement of the poultry carcasses being processed. A cutting station mounted on the frame is adapted to receive a poultry carcass and effect a pair of incisions in the tissue of the carcasses at the location of the thigh joints of the carcasses. The cutting station includes a pair of elongated parallel fixed blades which straddle the back portions of the carcasses at positions inside each thigh as the carcasses move through the processing path, and the blades progressively sever the tissue extending about the thighback portion joints, through a portion of the joints, but without severing all of the tissue extending from the back portions to the thighs. This leaves the thighs and legs physically connected by tissue to the back portion. The cutters are elongated so that once the leading end portion of a cutter begins its penetration through the tendons into the joint, the trailing portion of the cutter is already aligned with the joint and can extend on into the joint for completing the initial separation of the thigh bone from the skeletal portion of the back portion of the carcass.

The cutting station also includes a surface conveyor which engages and supports the back portions of the carcasses as the joints of the carcasses are being cut. The surface conveyor includes a pair of parallel conveyor flights which form a longitudinal gap between them for receiving the back bones of the carcasses, thereby tending to align the backbones between the conveyor flights. The conveyor is operated with a surface velocity which is greater than the velocity of the shackles, creating a sliding, relative movement between the back portions of the carcasses and the flights of the conveyor, which allows the protruding backbones to seek alignment between the flights of the conveyor.

A separating station is mounted on the frame of the apparatus and is positioned to receive the poultry carcasses after they have advanced through the cutting station. The separating station functions to rotate the back portions forwardly from an inverted attitude to an upright attitude while the legs remain inverted and to pull the back portions of the carcasses downwardly away from the shackled legs and the thighs and thereby separate the bones of the thighs from the backs. The separating station includes a vertically oriented rotating separator disk that has outwardly projecting teeth positioned to engage and seize the interior of the back portions of the carcasses as they move in sequence along the processing path. As the separator disk rotates, the backs are drawn around the periphery of the disk and thus are pulled in a downward arc away from the thighs of the carcasses, while the legs and thighs remain suspended in the shackles of the suspended conveyor and continue to move horizontally. The separated backs then are deposited in a receptacle beneath the apparatus while the suspended legs and thighs continue with the shackles along the processing path for further processing. Typically, the legs and thighs will be separated from each other farther down the processing path with equipment of a type disclosed in U.S. Pat. No. 4,896,399.

Positioned between the cutting station and the separator disk in the separating station of the apparatus are a pair of deflector bars positioned to engage and arrest forward movement of the leading portions of carcass backs as the carcasses move in sequence along the processing path. The deflector bars, being positioned in the path of the back portion of the carcasses cause the carcasses to tumble forwardly, so that the tails of the inverted carcasses which initially trailed the carcasses tumble over to an upright attitude and extend forwardly of back portions, as the back portions become engaged by the teeth of the rotary disk. The rotary separator disk is formed of relatively soft material, such as plastic or nylon (as opposed to stainless steel), and the peripheral teeth of the disk are formed so as to avoid tearing or damaging the back portions of the carcasses as the separator disk pulls the back portions in an arc path diverging downwardly away from the path of the legs and thighs. This rotation or tumbling action causes the balls of the thigh bones to be dislodged and pulled out of the sockets of the back portion. Thus, when the back is pulled away from the legs at the separating station, only tissue and not the joint itself must be separated. Knives are positioned at the arcuate path about the separator disk to cut the connecting tissue as it is being stretched between the diverging back portions and thighs so as to cut closely adjacent the back portions and to cut meat off the back portions and to retain as much meat as possible on the thighs. The result is an exceptionally clean separation of the thighs from the backs with the oysters of the thigh joints remaining on the thighs, as desired.

Thus, it is an object of this invention to provide an improved method and apparatus for separating the back portions from the thighs of poultry carcasses, as the carcasses are conveyed in spaced series along a processing path.

It is another object of this invention to provide an improved poultry leg and thigh processor of the type described wherein the balls of poultry thighs are dislodged from the sockets of the back portion of the carcasses as the backs are being pulled away from the thighs without causing damage to the bones of the birds, and with retention of more meat on the thighs.

Another object of the invention is to provide an improved method and apparatus for removing the thighs and legs from the back portions of poultry carcasses, which can be utilized with existing suspended shackle-type poultry processing lines.

Another object of the invention is to provide a poultry leg processor wherein the legs and backs of poultry carcasses are separated cleanly, reliably and uniformly with the oysters of the thigh joints remaining on the ends of the thigh bones after separation from the back of the carcass.

These and other objects, features and advantages of the invention will become more apparent upon reviewing the following detailed description, taken in conjunction with the accompanying drawings.

DETAILED DESCRIPTION

Figure 1:
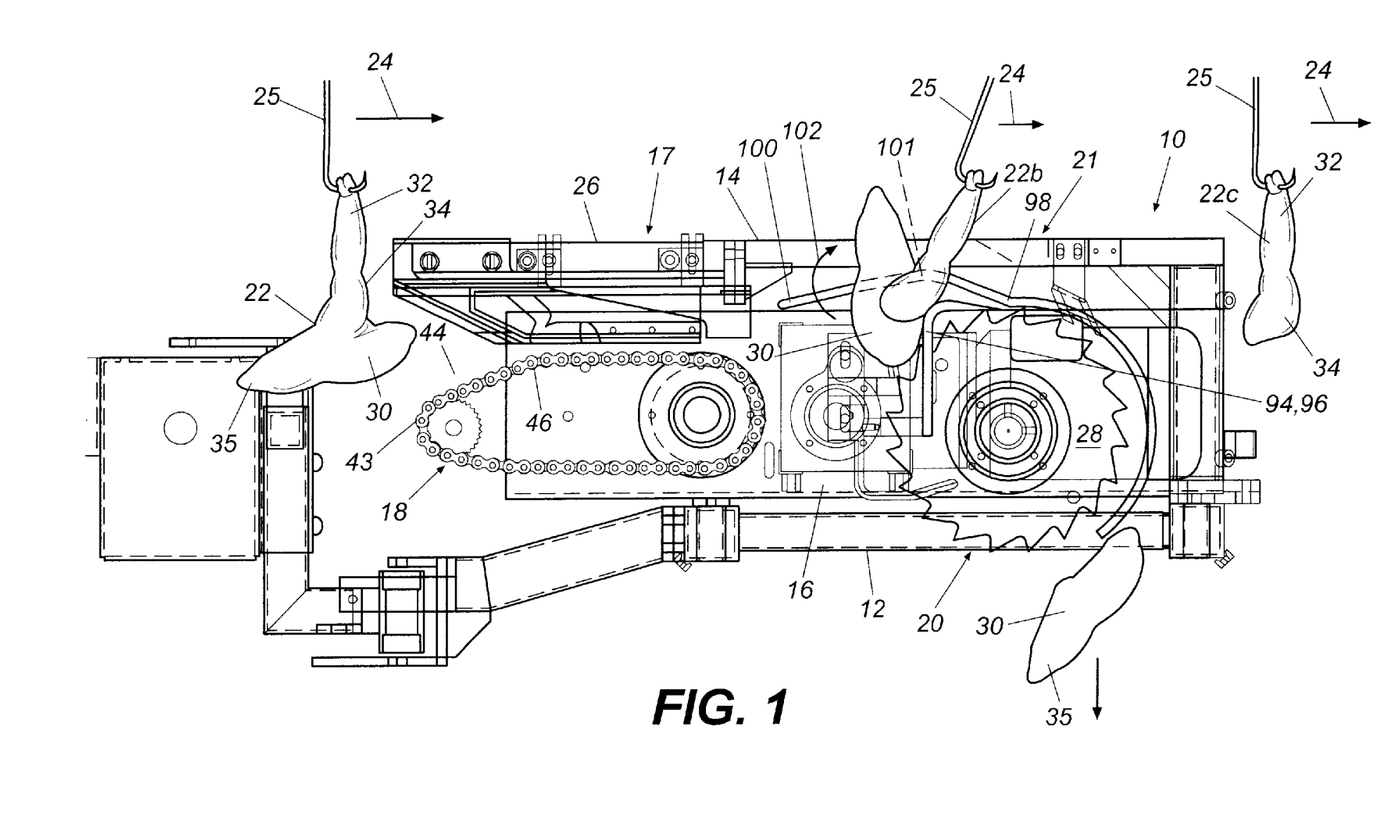
FIG. 1 is a side elevational view of the leg and thigh processor, with parts broken away to illustrate the movement of the saddle portion of a poultry carcass through the processor.

Referring now in more detail to the drawings, in which like numerals indicate like parts throughout the several views. FIG. 1 illustrates the leg and thigh processor 10 which includes a lower horizontal support 12, an upper horizontal support 14, and an L-shaped support plate 16, with these elements being rigidly connected together and supporting the surface conveyor 18 at the cutting station 17 and the separator assembly 20 at the separator station 21. As illustrated in FIG. 1, the leg processor moves the saddle portion 22 of the previously eviscerated and separated poultry carcass along a processing path as indicated by arrows 24, first through the cutting station 17 which includes the surface conveyor 18 and the cutter assembly 26 that is positioned above the surface conveyor, which work together to cut the tendons and other tissue at the joints between the thighs and the back portion of the carcass. The partially processed saddle is then moved through the separator station 21 which includes separator assembly 20 where the back portion is tumbled or rotated forwardly and guided toward the upper arc of the separator disk 28. The separator disk and its guide bars cause the thigh/back portion joints to separate, and the tissue still connecting the joints is cut while the back portion moves on the separator disk, thereby completely separating the back portion 30 from the legs 32 and thighs 34.

Figure 4:
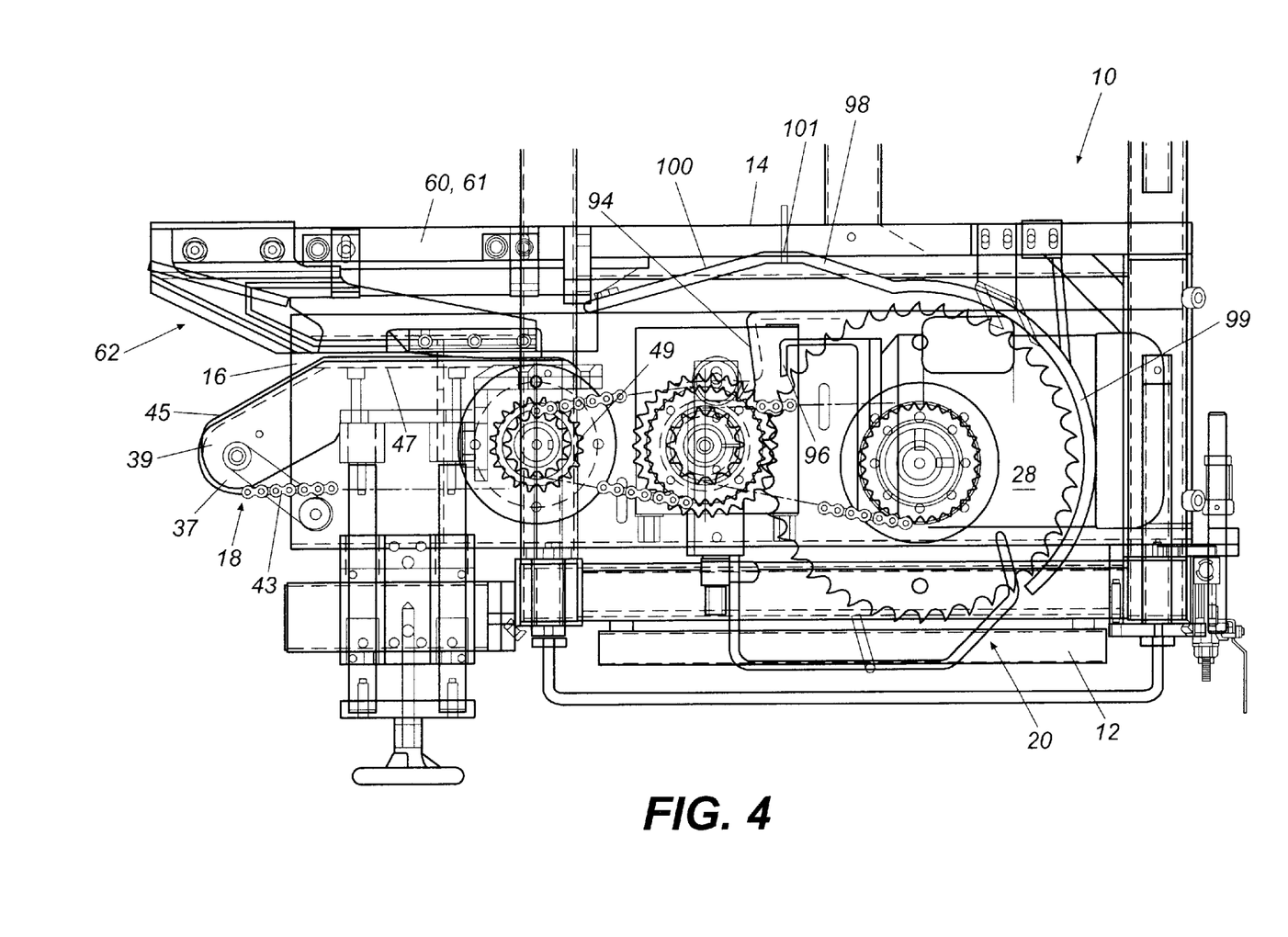
FIG. 4 is a side elevational view thereof, similar to FIG. 1, but showing more details of the mechanical components of the leg and thigh processor.
Figure 5:
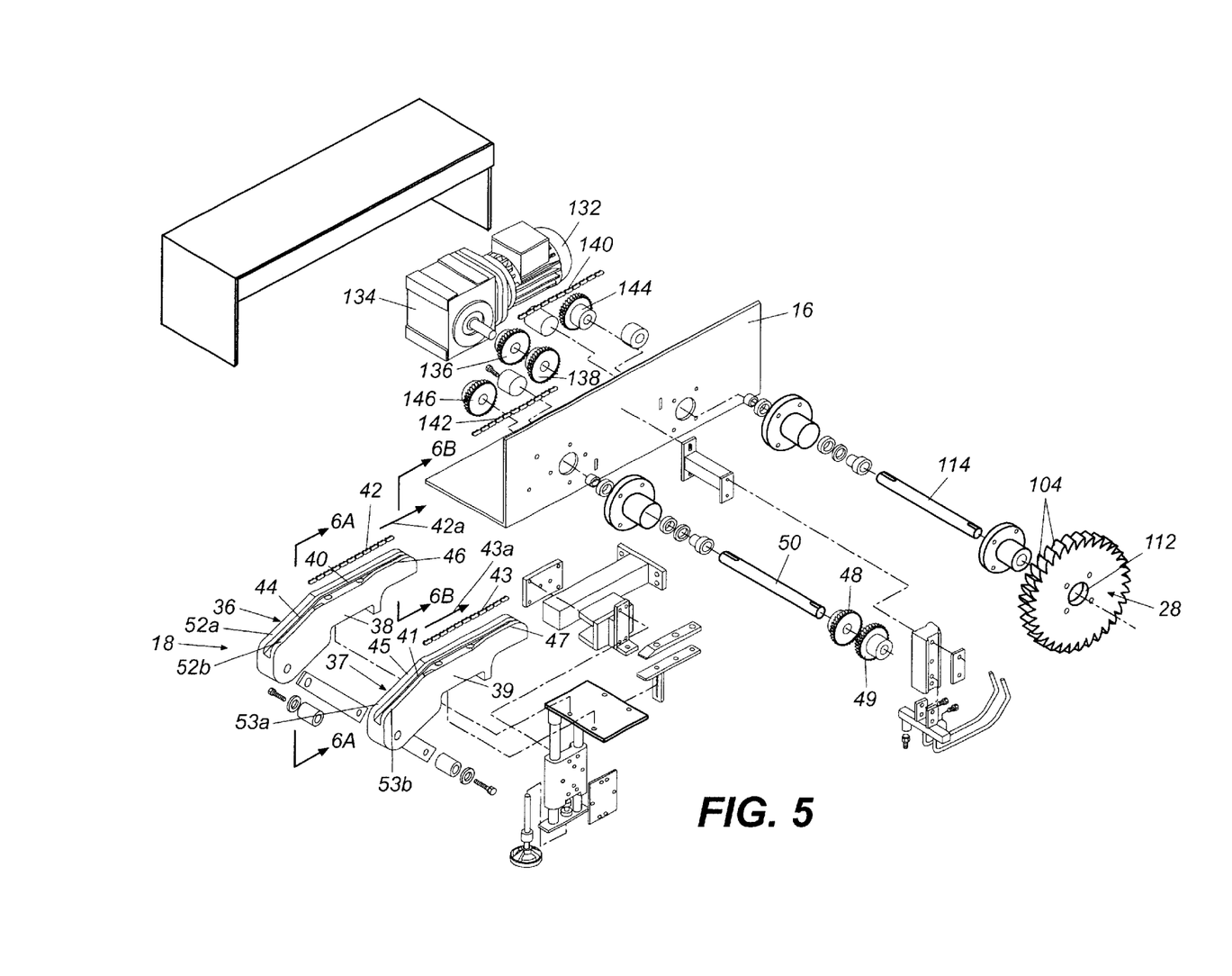
FIG. 5 is an expanded prospective illustration of the surface conveyor, the separator disk and the drive motor.

As illustrated in more detail in FIGS. 4 and 5, the surface conveyor 18 includes a pair of parallel conveyor flights 36 and 37, with the conveyor flights being mirror images of each other. Conveyor flights 36 and 37 each include chain guides 38 and 39, and the chain guides each define chain guide recesses 40 and 41, which receive and guide conveyor chains 42 and 43, respectively, that move in the directions indicated by arrows 42a and 43a. The chain guides 38 and 39 each include a first inclined portion 44 and 45, and a second horizontal portion 46 and 47, causing the conveyor chains 42 and 43 to move first upwardly along the incline of the chain guide recesses, and then horizontally.

Chain drive sprockets 48 and 49 are positioned beyond chain guides 38 and 39, respectively, and engage with the chains, driving the chains about the chain guides. The chain drive sprockets 48 and 49 are rotated on a common axle 50, with the axle being supported by the upright wall of the L-shaped support plate 16.

Figure 6A:
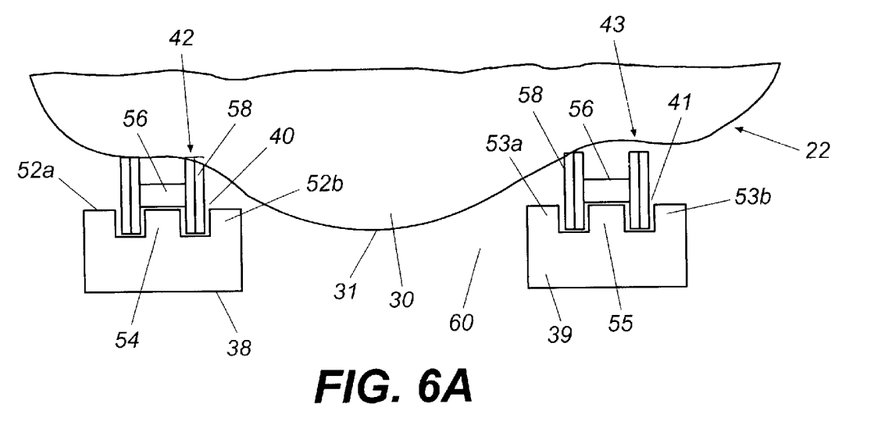
FIGS. 6A and 6B are schematic end views of the surface conveyor, showing the spaced parallel conveyor flights and a back portion of a bird aligned between the conveyor flights.
Figure 6B:
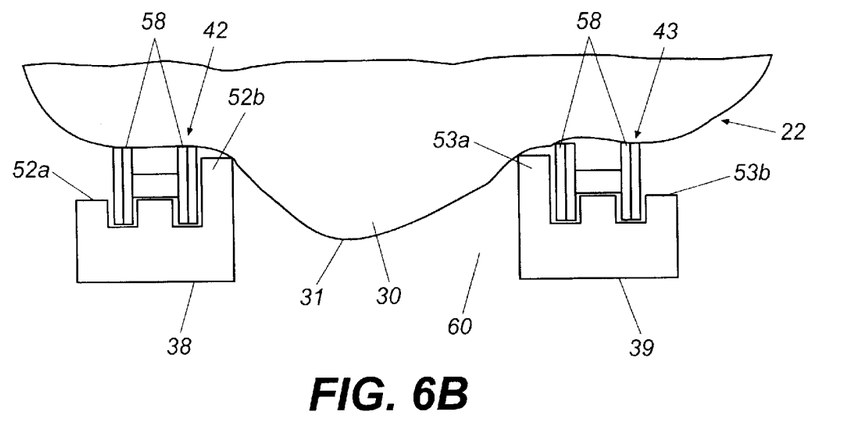

As illustrated in FIGS. 5, 6A and 6B, the chain guide recesses 40 and 41 of the chain guides 38 and 39 are formed with side rails 52a and 52b and 53a and 53b, and a center rail 54 and 55, respectively. The rollers 56 are positioned adjacent and tend to engage and roll on the center rails 54 and 55, while the chain links 58 are received in the recesses 40 and 41 adjacent the side rails.

As illustrated in FIG. 6A, when the conveyor chains 42 and 43 move up the first inclined portion 44, 45 of each of the chain guides 38, 39, the chain links 58 are exposed above the chain guides 38 and 39, and are available to support the exterior surface of the back portion 30 of the saddle 22 of the poultry carcass, with the protruding backbone or spine 31 received in the space 60 between the conveyor flights.

The linear movement of the conveyor chains 42 and 43 is faster than the linear movement of the poultry carcass 22 as carried by the suspended shackles 25. The edge surfaces of the chain links 58 are relatively smooth, and the surface of the bird against which the chain links are engaged is relatively slippery, so that relative movement is created between the conveyor chains 42 and 43 and the carcasses 22. This relative movement tends to allow the protruding backbone portion 31 of the carcass 30 to seek the space 60 between the conveyor flights. This occurs as conveyor chains 42 and 43 move up the first inclined portions 44 and 45 of the chain guides 38 and 39.

When the chain guides 38 and 39 guide the conveyor chains 42 and 43 along the second horizontal portion of the processing path of the conveyor flights, the inside side rails 52b and 53a are positioned higher. With this arrangement, part of the weight of the poultry carcass becomes supported on the higher inside guide rails 52b and 53a, while the conveyor chains 42 and 43 continue to lightly engage and transport the poultry carcasses 22 along the horizontal run of the surface conveyor.

In the meantime, while the inside guide rails 52b and 53a support the carcass, the initial incision by the cutting blades at the thigh/back portion joints are made. Therefore, the downward force exerted when making the incision is borne by the inside guide rails 52b and 53a. In addition, the inside guide rails 52b and 53a help stabilize the conveyor chains 42 and 43, tending to avoid lateral shifting of the conveyor chains during the stretches of chain movements that oppose the force applied by the cutting blades to the carcass 30.

Figure 7:
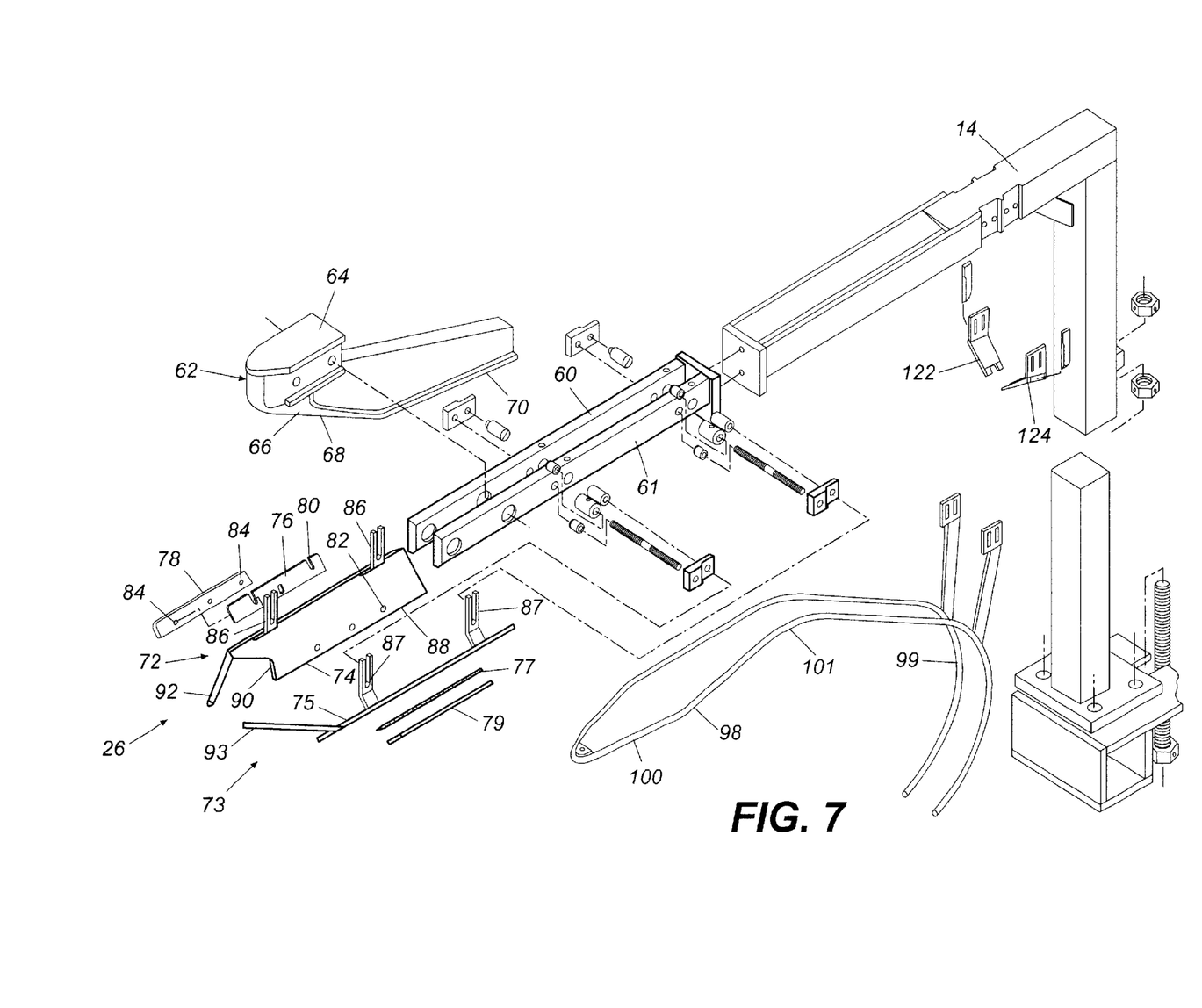
FIG. 7 is an expanded perspective illustration of the components of the system that are supported by the upper horizontal support bar.

As best illustrated in FIGS. 4 and 7, cutter assembly 26 is mounted to the upper horizontal support 14 over the surface conveyor 18, and includes a pair of parallel support bars 60 and 61 which are rigidly mounted to and are coextensive with upper horizontal support 14. A separator bow 62 includes upper support block 64 for mounting the separator bow between the support bars 60 and 61, and a depending thigh separator 66. The thigh separator 66 includes a downwardly depending sloped convex surface 68 and the horizontal continuation thereof 70. The shape and incline of the separator bow is arranged to engage the poultry carcass saddles between the thighs, so as to urge the thighs in an outwardly sloped attitude, and to hold the back portion and thighs in a proper aligned position with respect to the rest of the assembly while the first and continuing cuts are made in the tendons and other tissue extending between and about the joints of the thigh/back portion.

A pair of mirror image elongated cutter blade assemblies 72 and 73 are mounted to the parallel support bars 60 and 61, and each comprises a plow plate 74, 75, elongated cutter blade 76, 77, and a separator bar 78, 79, respectively. The elongated cutter blades 76 and 77 are adjustably mounted by means of open-ended slots 80 to openings 82 of the plow plates 74 and 75, and the separator bars 78 and 79 are similarly attached by their openings 84 to the plow plates 74 and 75. The angles and amount of protrusion of the elongated cutter blades can be adjusted with respect to plow plates 74 and 75 and separator bars 78 and 79 by means of the elongated slots 80. The plow plates 74 and 75 are suspended from the upper horizontal support 14 by means of outwardly extending, slotted brackets 86 and 87.

It will be noted that the plow plates are angled downwardly and inwardly toward each other, with their lower edges 88 converging toward each other and with their outer surfaces angled so as to orient the thighs of the carcasses at the same angle. In addition, the leading edges of the plow plates 74 and 75 include a vertical scraper edge 90 that tends to scrap along the inner surface of the proximal end portion of the thighs of the carcass saddle to remove any fat or loose material from the carcass. In addition, plow bars 92 and 93 extend from the upper portion of the plow plates and converge together so as to deflect the legs of the on-coming carcasses away from each other.

Figure 2:
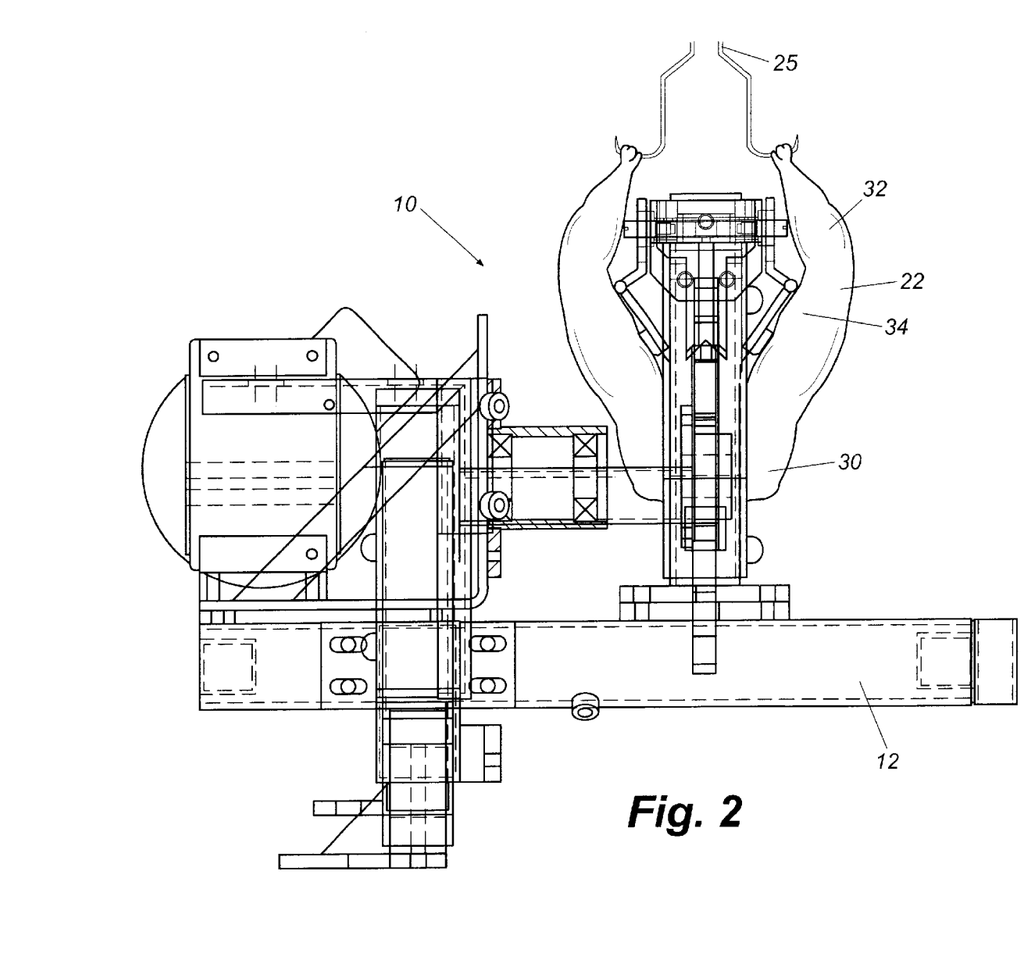
FIG. 2 is an end elevational view thereof.
Figure 3:
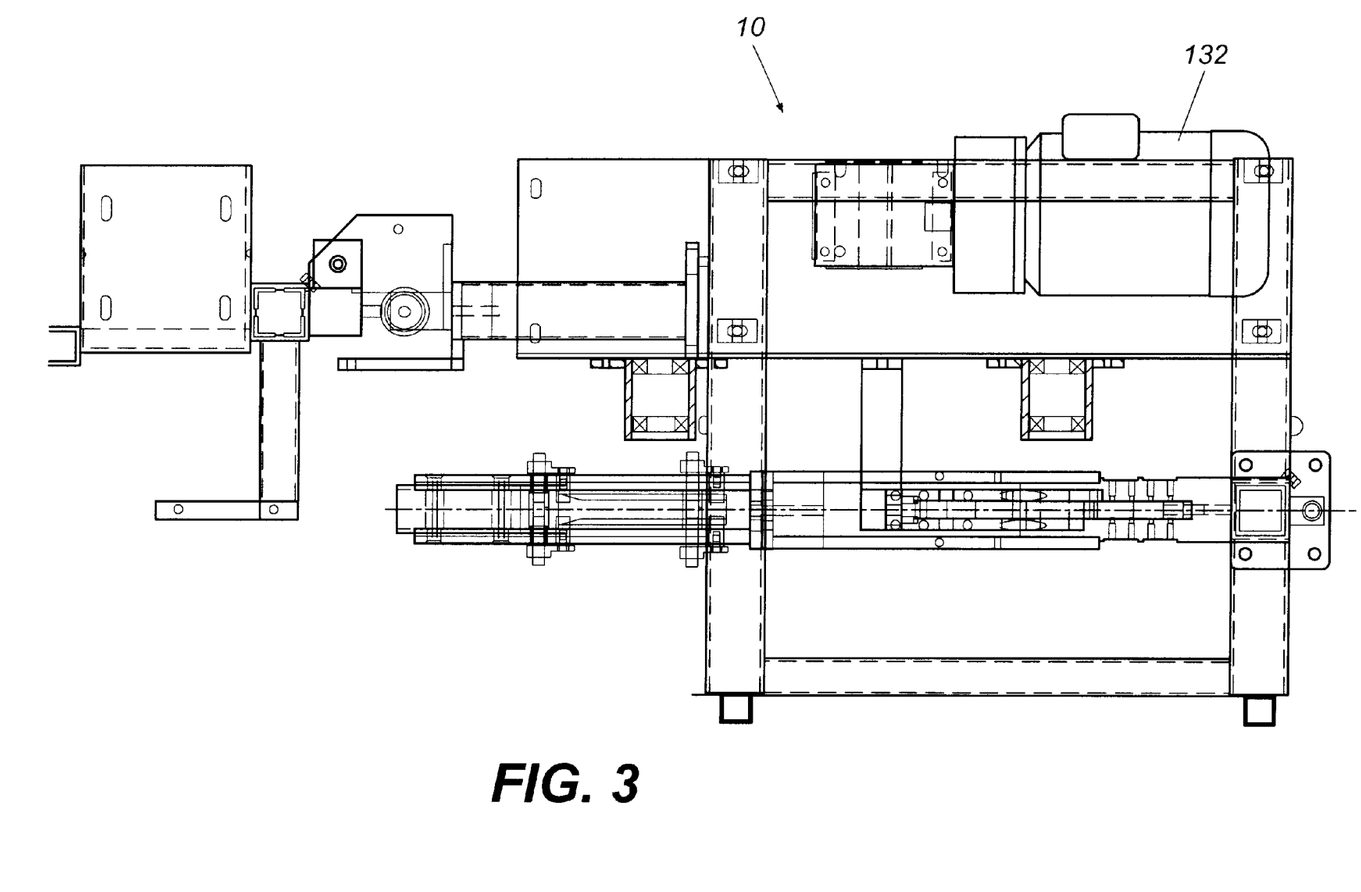
FIG. 3 is a top plan view thereof.

The arrangement of the separator bow 62 and the cutter assembly 26 over the surface conveyor 18 requires the carcasses 22 to be received (as shown in FIGS. 1 and 2) with the legs and thighs and 34 straddling the separator bow 62 and cutter assembly 26, and the back portion 30 positioned in sliding relationship with respect to the elongated cutter blades 76 and 77, and with the surface conveyor 18 urging the back portion upwardly into contact with the elongated cutter blades.

Separator assembly 20 includes a pair of deflector bars 94 and 96 (FIG. 4) which are positioned ahead of separator disk 28, down the processing path from surface conveyor 18. Disk guide bar 98 extends between surface conveyor 18 and separator disk 28, extending about the upper and rear peripheries of the separator disk. The disk guide bar 98 is inclined upwardly at its entrance portion 100, and then is inclined downwardly over the separator disk 28 at 99, forming an intermediate arch 101. As shown in FIG. 1, when the poultry carcass leaves the surface conveyor 18 and cutter assembly 26, the forward portion of the back 30 of the carcass will engage deflector bars 94 and 96 so as to rotate in a forward direction, bringing the tail 35 over the back portion, as indicated by arrow 102 (FIG. 1), beneath the arched portion 101 of the disk guide bar 98, so that the interior surface of the back portion will land on and be engaged by separator disk 28.

Figure 8:
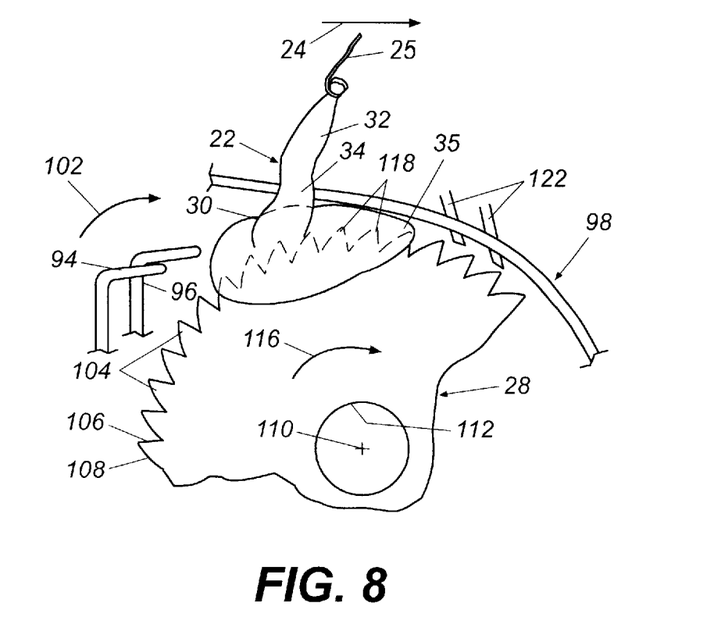
FIG. 8 is a partial side elevational view of a portion of a separator disk, illustrating the position of a poultry saddle as the back portion is being separated from the thighs.

As illustrated in FIG. 8, separator disk 28 has a plurality of equally sized perimeter teeth 104 which are equally spaced about the disk. Each tooth 104 includes a radial surface 106 and a sloped surface 108. The radial surfaces 106 of each tooth extend approximately radially from the axis 110 about which the disk rotates. A central opening 112 is formed in the disk, and the central opening is mounted on a rotary axle 114 which is rotatably supported by the L-shaped support plate 16 (FIG. 5). The separator disk 28 rotates in the direction as indicated by arrow 116, so that the radial surfaces 106 are oriented approximately at a right angle with respect to the direction of rotation of the disk. Thus, when the interior surface of the back portion 30 engages the perimeter teeth 104, the flat radial surfaces of the teeth 104 tend to carry the back portion in the direction of rotation 116, instead of sliding beneath the back portion as might be encountered by a sloped tooth surface. In addition, the vertebrae and other protruding portions of the interior surface of the back portion tend to protrude between and become engaged by the teeth, assuring that the back portion will be firmly moved in unison with the separator disk 28. In the meantime, disk guide bar 98, which comprises a bifurcated bar arrangement (FIG. 7) engages the exterior of the back portion 30 and urges the back portion into firm contact with the apexes 118 of the teeth 104. The disk guide bar 98 and disk teeth 104 carry the back portion in a downward arc away from the path of travel of the shackle 25, leg 32 and thigh 34 in the direction indicated by arrow 24. The rotary movement of the back portion 30 as indicated by arrow 102, which results from the back portion rotating over the deflector bars 94 and 96 as the back portion approaches the separator disk, and then the continued rotary motion of the back portion as it is stretched downwardly away from the thighs 34 results in pulling the thigh bone from the socket of the back portion. Pairs of cutter blades 122 and 124 are supported from upper horizontal support 114 (FIG. 7) and protrude downwardly between the bifurcated disk guide bar 98, and are located in the path of the back portion 30 as the back portion is moved by the rotation of the separator disk 28, so that the pairs of cutter blades 122 cut the tissue extending from the back portion to the thighs 34 adjacent the back portion, thereby allowing the maximum amount of meat to be retained by the thighs.

Separator disk 28 is formed from a relatively soft material as compared to stainless steel. The preferred material is nylon or UHMW. However, other relatively soft materials can be utilized as may be desired. The tooth formation is formed by cutting into the edge of the material, and once the teeth have been formed, the edges are ground off to a radius that is sufficiently dull to avoid tearing of the tissue of the birds during normal operation of the system. While separator disks made from the softer materials tend to wear more rapidly than steel disks, they are much less expensive than steel disks.

The separator disks are 11" in diameter from tooth apex to tooth apex, and ⁵⁄₁₆" thick. This dimension is selected so that a rather shallow downward arc of movement is imparted by the separator disk to the back portions of the carcasses, allowing the path of the back portion to diverge gradually from the horizontal paths of the thighs, so as to prolong the stretching of the tissue as the tissue is being cut by the pairs of cutter blades 122. In the preferred embodiment, the separator has forty teeth with the radial surfaces having a height of ⅜". The thickness of the cutter disk is chosen so as to provide a relatively wide apex 118 of the teeth which tend to straddle the vertebrae of the back portion of the bird. Also, the relatively wide separator disk is chosen over a pair of thinner parallel disks so as to avoid entrapment of undesired matter between the pair of disks. The selection of a wider tooth also spreads the force imparted by the teeth over a larger contact area of the bird, reducing the tendency to damage the bird.

Figure 9:
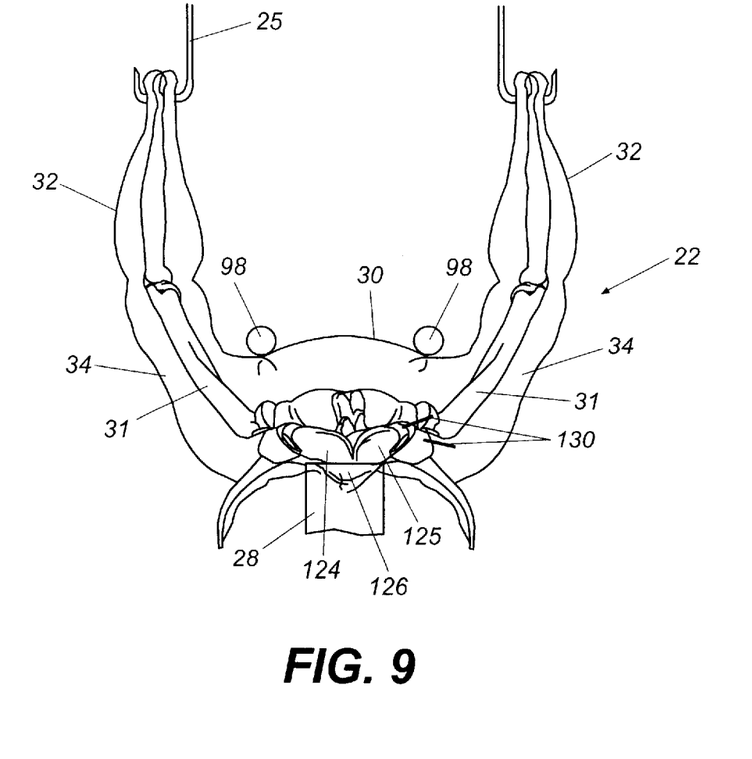
FIG. 9 is a schematic internal view of the saddle of a poultry carcass as the leg bones are about to be twisted out of the sockets of the back portion as the saddle is moved about the separator disk.

As illustrated in FIG. 9, the saddle portion 22 of the bird is shown as it transverses the separator disk 28 in the position illustrated in FIG. 8. The oysters 124 and 125 are to be removed with the thighs 34 as the vertebrae 126 continues to move with the separator disk 28. The thigh bones 31 pull from their sockets and carry the oysters 125 with them.

The cuts into the tissue made by the pairs of cutter blades 122 are indicated at 130.

The rotary axle 114 of the separator disk 28 and the rotary axle 50 of the chain drive sprockets 48 and 49 are driven by motor 132, through gear box 134 and drive sprockets 136 and 138. The drive sprockets 136 and 138 drive the chains 140 and 142, respectively, that rotate the axle sprockets 144 and 146, respectively.

Although a preferred embodiment of the invention has been disclosed in detail herein, it will be obvious to those skilled in the art that variations and modifications of the disclosed embodiment can be made without departing from the spirit and scope of the invention as set forth in the following claims.

What is claimed is:

1. In an automated poultry processing system of the type for processing poultry carcasses suspended by shackles and moved in sequence along a processing path, with the shackles being configured to suspend the poultry carcasses upside down by their legs, a method of separating the legs from the back portions of the poultry carcasses from which the entrails and breasts have previously been removed as the carcasses move in sequence along the processing path, said method comprising the steps of:

(a) placing the back portion of the poultry carcasses on a surface conveyor having a pair of parallel conveyor flights extending along the conveyor path and spaced apart and forming a longitudinal conveyor gap therebetween with the conveyor flights straddling the back bone of the poultry carcasses;

(b) advancing the conveyor at a rate faster than the rate of the shackles and sliding the surfaces of the conveyor flights against the skin of the back portion of the poultry carcasses to induce the shape of the protruding exterior surfaces of the back portions of the carcasses to seek the longitudinal conveyor gap and become aligned between the conveyor flights;

(c) as the exterior surface of the back portions of the poultry carcasses are aligned between the parallel conveyor flights and are moved along the processing path cutting the tissue of the carcasses adjacent the joints between the thigh bones and the back portions of the carcasses to begin the separation of the thighs from the back portions of the carcasses while leaving some of the meat extending from the back portions to the thighs uncut;

(d) rotating the back portions of the carcasses relative to the thighs through an arc sufficient to dislodge the balls of the thigh bones from the sockets of the thigh joints of the back portions; and (e) pulling the back portions of the carcasses away from the thighs to separate the back portions from the thighs at the locations of the thigh joints.

2. The method of separating the thighs from the back portions of poultry carcasses as set forth in claim 1, wherein the conveyor flights are each formed of continuous roller chains having rollers straddled by spaced chain links, and a stationary chain support that includes an elongated support rail that supports the rollers of the roller chains along the conveyor flights and a side rail extending parallel to said support rail for less than the entire length of the conveyor flight, said method comprising the steps of advancing the roller chains along the conveyor flight, supporting the back portions of the carcasses with the roller chains along the first portion of the conveyor flights, and supporting the back portions of the carcasses with both the roller chains and the side rail along the conveyor flight as the carcass is being cut.

3. The method of separating the thighs from the back portions of poultry carcasses as set forth in claim 1, and further including the step of:

sliding the back portions of the carcasses along and supporting the back portions on a pair of parallel side rails as the tissue of the carcasses adjacent the joints between the thigh bones and back portions is cut.

4. A method of advancing the saddle of a poultry carcass including the back portion, thighs and legs along a poultry processing path with the legs of each carcass suspended from a shackle, comprising:

advancing the carcass along the processing path with the back portion inverted, rotating the back portion to an upright attitude, engaging the area of the back portion of the carcass in the visceral cavity about the back bone with the peripheral teeth of a rotating disk, with the teeth of the disk each having an apex and a radially oriented surface facing in the direction of rotation of the disk with spaces formed between the teeth, engaging the backbone with the apex of the teeth so that the back bone registers with the spaces between the apexes of the teeth, and urging the backbone in the direction of rotation of the disk with the radially oriented surface.

5. The method of advancing the saddle of a poultry carcass of claim 4, wherein the step of urging the back bone in the direction of rotation of the disk comprises urging the back bone in an arc about the disk as the legs are urged by the shackles along a generally horizontal path.

6. In an automated poultry processing system of the type for processing the saddles of poultry carcasses having thighs connected to the back portions of the carcasses and suspended by shackles and moved in sequence along a processing path, a method of separating the thighs from the back portions of the carcasses, comprising:

suspending the legs of the carcasses from a spaced series of shackles, advancing the shackles and the carcasses along the processing line, placing the back portions of the carcasses on a surface conveyor having a pair of parallel conveyor flights extending along the processing path and spaced apart and forming a longitudinal conveyor gap therebetween with the conveyor flights straddling the backbone of the poultry carcasses, advancing the conveyor at a rate different from the rate of the shackles and sliding the surfaces of the conveyor flights against the exterior surfaces of the back portions of the carcasses to cause the protruding back portions of the carcasses to seek the longitudinal conveyor gap and become aligned between the conveyor flights, and as the exterior surfaces of the back portions of the carcasses are aligned between the parallel conveyor flights and are moved along the processing path supporting the carcasses on support rails straddling and extending parallel to the processing path and cutting the tissue about the joints of the thighs and back portions of the carcasses as the carcasses are supported on the support rails.

7. In an automated poultry processing system of the type for processing eviscerated poultry carcasses of birds as the carcasses are moved by a suspended conveyor system in sequence along a processing path with the shackles configured to suspend the birds by their legs usually in an inverted attitude, the improvement therein of:

means for rotating the carcasses of the birds to an upright attitude as the birds move along the processing path while the legs of the birds remain in an inverted attitude; and a rotary disk having an edge with peripheral teeth, said disk formed of UHMW plastic material and having a diameter of at least 11 inches and said teeth each having a substantially radially extending surface for engaging the visceral cavities of the birds at the backbones of the birds when the carcasses of the birds are upright and moving the birds along a downward arc, and a width of at least $5/8$ inch to sufficiently fill the width of the visceral cavities of the birds for ensuring that the teeth engage the visceral cavities at the backbones of the birds when the birds engage the rotary disk.

8. In an automated poultry processing system of the type for processing eviscerated poultry carcasses of birds as the birds are moved by the shackles of a suspended conveyor system in sequence along a processing path with the shackles configured to suspend the birds by their legs usually in an inverted attitude, the improvement therein comprising:

a surface conveyor having a pair of spaced parallel conveyor flights having smooth surfaces for engaging the carcasses and defining a path therebetween and positioned beneath said shackles a distance less than the height of the carcasses of the birds as suspended by the shackles so that the birds carried by the shackles rest on the smooth surfaces of said conveyor flights; and drive means for advancing said conveyor flights at a velocity different than the velocity of the shackles for creating relative movement between said conveyor flights and the birds and causing the carcasses to seek the path between the conveyor flights.

\* \* \* \* \*